United States Patent [19]

Miyata

[11] Patent Number: 4,815,573
[45] Date of Patent: Mar. 28, 1989

[54] LIQUID-COOLED DISC BRAKE

[75] Inventor: Katsuhiro Miyata, Saitama, Japan

[73] Assignees: Akebono Brake Industry Co., Ltd, Tokyo; Akebono Research & Development Centre Ltd., Hanyu, both of Japan

[21] Appl. No.: 103,210

[22] Filed: Oct. 1, 1987

[30] Foreign Application Priority Data

Oct. 2, 1986 [JP] Japan .................................. 61-233360

[51] Int. Cl.$^4$ ............................................. F16D 65/84
[52] U.S. Cl. .................... 188/264 F; 188/71.6; 188/264 D; 188/264 P
[58] Field of Search .............. 188/71.6, 264 R, 264 D, 188/264 F, 264 CC, 264 P

[56] References Cited

U.S. PATENT DOCUMENTS

| | | | |
|---|---|---|---|
| 2,966,966 | 1/1961 | Eames | 188/264 F |
| 3,862,678 | 1/1975 | Collins | 188/264 D X |
| 3,870,118 | 3/1975 | Klave | 188/264 D X |
| 3,915,262 | 10/1975 | Klave | 188/264 D X |

FOREIGN PATENT DOCUMENTS

| | | | |
|---|---|---|---|
| 2309330 | 9/1973 | Fed. Rep. of Germany | 188/264 D |
| 775052 | 5/1957 | United Kingdom | 188/264 F |

*Primary Examiner*—Andres Kashnikow
*Assistant Examiner*—Matthew C. Graham

*Attorney, Agent, or Firm*—Cushman, Darby & Cushman

[57] ABSTRACT

A liquid-cooled disc brake for use in a vehicle having a rotatable shaft, at least one rotor fitted to the outer peripheral surface of the shaft, in which the rotor is unrotatable but slightly axially movable with respect to the shaft, a caliper secured to the vehicle body, having a first wall, a second wall positioned opposite to the first wall and a third wall. The caliper is substantially U-shaped in section with its inner peripheral side opening to thereby surround the whole perimeter of the rotor. The second wall of the caliper is made hollow so that the cooling liquid circulates freely through the hollow portion of the second wall. The disc brake further includes means for thrusting against the rotor provided at an inner side of the first wall of the caliper. The thrust means is operated at the time when the brake is performed. The disc brake also has at least one stator provided in the opening portion of the U-shaped caliper, where the stator is unrotatable with respect to the caliper, and the stator is urged by the thrust means against the rotor to thereby perform the brake operation. The stator has therein at least one flow channel through which the cooling liquid circulates. The third wall of the caliper has at least one recessed portion which communicates the one flow channel of the stator with another flow channel thereof while maintaining the intended liquid-sealability inside and outside the flow channel.

12 Claims, 2 Drawing Sheets

LIQUID-COOLED DISC BRAKE

BACKGROUND OF THE INVENTION

The present invention relates to liquid-cooled disc brakes incorporated in wheels of automobiles, particularly wheels of large-sized vehicles such as motor trucks and buses, and the invention is used for stably braking such large-sized vehicles running at high speeds.

With the spread of a network of highways, disc brakes are more commonly used as brakes of automobiles because, as compared with drum brakes, the disc brakes can offer high heat radiation efficiency and also obtain stable braking force. The diffusion of disc brakes is observed in the field of not only passenger cars but also large-sized vehicles such as buses and motor trucks, particularly sightseeing buses and long-distance motor trucks, which often utilize superhighways. However, disc brakes for use in such large-sized vehicles are to meet brake requirements more severe than those intended for passenger cars, and any disc brake for use in a passenger car, provided its size only is increased, may have heat insufficiently radiated depending on braking conditions, thus lowering the braking force.

For that reason, there has been proposed, as disclosed in Japanese Patent Application (OPI) No. 107132/80, a disc brake designed to give off, by means of liquid, heat generated by the friction between rotors and stators constituting the disc brake when the brake force is applied to the brake.

FIG. 4 shows the construction of a conventional liquid-cooled disc brake.

As shown in FIG. 4, a hub 4 is fitted via a spline mating portion 3 to an end of an axle shaft 2 passing through an axle housing 1 fixed to a vehicle body. The hub 4, together with the axle shaft 2, is rotatable with respect to the axle housing 1.

A plurality of rotors 8 set apart from each other are unrotatably fitted to the outer peripheral surface of an annular braking part 7 anchored with a stud 5 and a nut 6, the rotors 8 being movable with respect to the axle shaft 2.

A caliper 9 surrounding the whole perimeter of the rotors 8 is fixed in the proximity of the braking part 7. The caliper 9, substantially U-shaped in section with its inner peripheral side being open, is provided with an annular support wall 11 secured by a bolt 10 and a nut 12 to the outer peripheral face of the housing, and with an annular cubic body L-shaped in section and fixed close to the outer periphery of the support wall 11. Each support wall 11 of the cubic body 13 thus formed is used to hold the rotors 8 in between first and second annular walls 14, 15.

The outer edges of annular stators 19 set apart from each other are respectively fitted to the inner peripheral surface of a short cylindrical outer peripheral wall 18 for communicating the outer peripheral edges of both the annular walls 14, 15 with each other. The stators 19 are respectively inserted in between the rotors, the end of an annular piston 17 as described later and the rotor 8, or between the rotor 8 and a spacer 47 fitted to the inner surface of the second annular wall 15.

An annular cylinder 16 is fitted to the first annular wall 14 formed with a portion close to the outer periphery of the support wall 11 so that the cylinder 16 opens to the inner face of the first annular wall 14. The annular piston 17 is fitted into the cylinder 16. The piston 17 projects toward the rotors 8 when hydraulic oil is supplied to the cylinder 16.

In a middle portion of the housing 1 matching with the inner periphery of a space 20 enclosed by three walls consisting of the first and second annular walls 14, 15 and the outer peripheral wall 18, there is provided an oil supply channel 21 communicating the inside of the housing 1 with the space 20, whereas an oil discharge channel 22 is formed in the outer peripheral wall 18 to partition the outer periphery of the space 20 and to communicate the inside with the outside of the space 20. An oil supply pipe 23 communicates the oil discharge channel 22 with the housing 1.

The inner peripheral edges of the rotors 8 respectively engage with the outer peripheral surface of the braking part 7, whereas the outer peripheral edges of the stators 19 respectively engage with the inner peripheral surface of the outer peripheral wall 18. In addition, grooves 24, 25 for distributing cooling oil are formed so that the cooling oil reaching the inner peripheral portions of the stators 19 via through-holes 26 formed in the braking part 7 flows through the stators 19 and the rotors 8 and reaches the oil discharge channel 22.

When the conventional liquid-cooled disc brake thus constructed is used to brake an automobile, hydraulic oil is applied to the cylinder 16 installed in the support wall 11 to urge the piston 17 fitted into the cylinder 16 toward the rotors 8. The piston 17 is pushed to narrow the space between the end face of the piston 17 and the inner face of the second annular wall 15 and causes the rotors 8 rotating together with the wheel and the stators 19 to rub against one another. The brake operation for stopping the rotation of wheel is thus performed.

In the case of the conventional liquid-cooled disc brake thus constructed and functioning, however, cooling oil always flows in between the rotors 8 rotated together with the wheels and the unrotatable stators 19, so that the braking parts composed of the rotors 8 and the stators 19 function as a sort of fluid coupling. Consequently, the resistance resulting from the rotation of the axle shaft 2 even during the time the brake force is not applied causes a bad influence on not only the power performance but also fuel consumption rate of the vehicle.

SUMMARY OF THE INVENTION

An object of the present invention is to provide a liquid-cooled disc brake which can overcome the aforesaid drawbacks.

The liquid-cooled disc brake according to the present invention has, as in the case of the conventional liquid-cooled disc brake, one or a plurality of rotors set apart from each other and fitted to an axle shaft, the rotors being unrotatable but axially movable with respect to the axle shaft.

A caliper substantially U-shaped in section with its inner peripheral side opening is secured to an unrotatable part provided in the proximity of the braking part in such a manner as to surround the whole perimeter of the rotors. A piston which projects in the direction of the rotors at the time of braking is fitted into a cylinder opening to the inner face of a first annular wall, out of first and second annular walls formed into such a caliper and rotatably holding the rotors in between their inner faces opposite to each other.

A cooling liquid circulates in the hollow second annular wall. Each stator is held between the end face of the piston and the rotor or between the rotors when a plurality of rotors are installed. The stator, which is annular as a whole, has a flow channel in its inner side thereof for having the cooling liquid circulated and is mated with the inner side of a short cylindrical outer peripheral wall for communicating the outer peripheral edges of the first and second annular walls with each other in such a state that the intended liquid-sealing inside and outside the flow channel is maintained. Moreover, means for supplying and discharging the cooling liquid are provided in the flow channel of each stator to permit the cooling liquid to circulate in the flow channel inside the stator.

When the liquid-cooled disc brake thus constructed according to the present invention is operated, the piston fitted into the cylinder of the first annular wall is projected to the rotors. Then the space between the end face of the piston and the second annular wall is narrowed. Consequently, the side of one rotor or sides of the plurality of rotors, the side of one stator or sides of the plurality of stators, and the inner side face of the second annular wall strongly rub against one another to effect braking operation.

Although the surface temperature of each member rises because of frictional heat, the heat is instantly taken by the cooling liquid flowing through the cooling liquid channel formed inside each stator and through the second annular wall. Accordingly, the temperature of the surface forming a common boundary between the rotor and the stator rubbing against each other will never rise up to the extent that normal brake operation cannot be performed. On the other hand, because no liquid exists in between the rotor and the stator, the rotating rotor will not generate such resistance while the brake is not operated as in the case of the conventional liquid-cooled disc brake.

BRIEF DESCRIPTION OF THE DRAWINGS

FIG. 1 is a sectional view of what is equivalent to a portion A of FIG. 4; and

FIG. 2 is a sectional view taken on line B—B of FIG. 1; and

DETAILED DESCRIPTION OF PREFERRED EMBODIMENT

Referring now to the accompanying drawings, the present invention will subsequently be described in detail.

Figure 1:
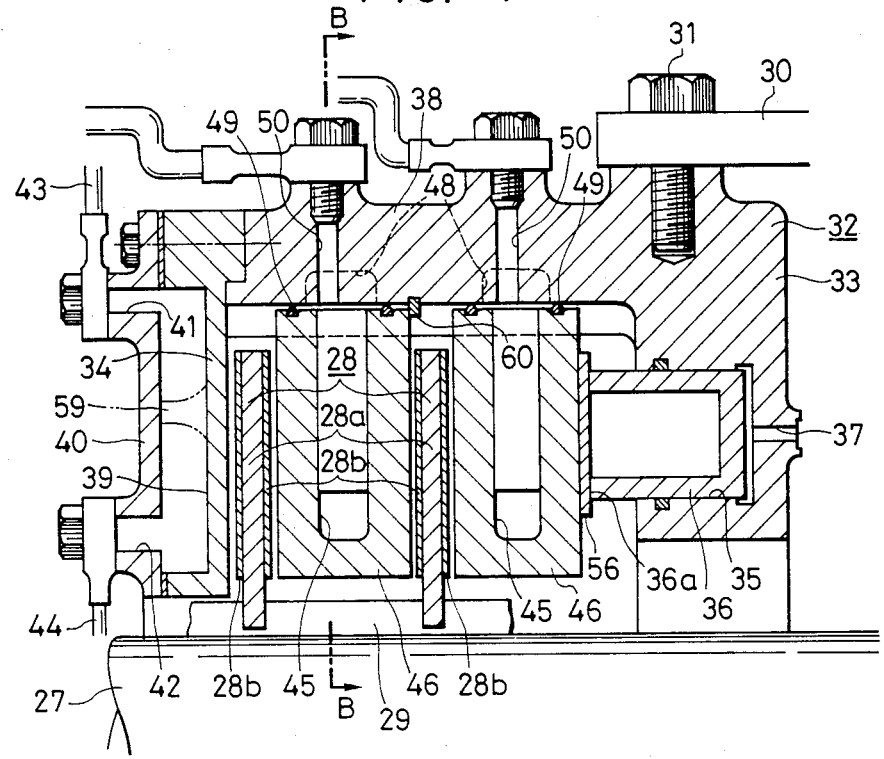
FIGS. 1 and 2 show a liquid-cooled disc brake embodying the present invention.
Figure 2:
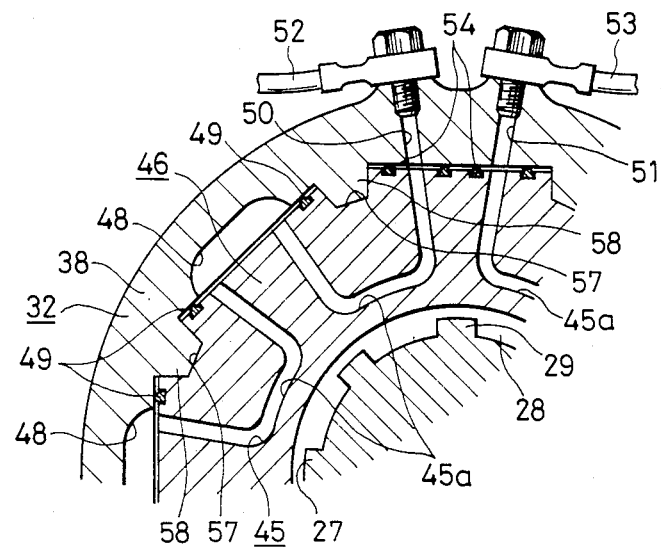
Figure 4:
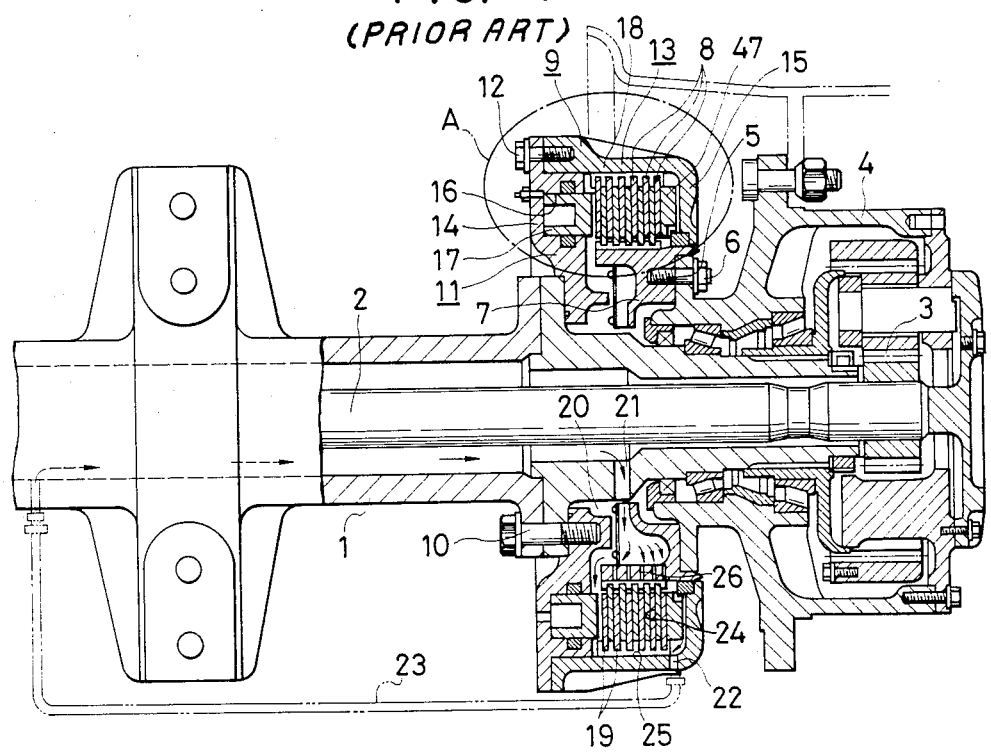
FIG. 4 is a cross-sectional top view of a conventional liquid-cooled disc brake.

FIGS. 1 and 2 show a liquid-cooled disc brake embodying the present invention. FIG. 1 is a sectional view of what is equivalent to a portion A of FIG. 4, and FIG. 2 is a sectional view taken on line B—B of FIG. 1.

As shown in FIG. 1, two annular rotors 28 set apart from each other are fitted to the outer peripheral surface of a braking shaft 27 such as an automotive axle shaft so as to be slightly movable in the axial direction (horizontal direction of FIG. 1) by engaging serrations 29 of the shaft 27. Each of the two rotors 28 comprises an annular metal base 28a and sintered metal or carbon linings 28b secured to both sides of the metal base 28a.

A caliper 32 which is substantially U-shaped in section with its inner peripheral side opening is anchored with a bolt 31 to a support bracket 30 secured to a car body in the proximity of the braking shaft 27 to thereby surround the whole surface of the two rotors 28.

The caliper 32 is provided with a first annular wall 33 and a second annular wall 34 which hold the rotors 28 therebetween. A cylinder 35 is opened to the inner face of the first thick annular wall 33 located on the inner side (which is closer to the center when the disc brake is installed in the vehicle, i.e., the right-hand side of FIG. 1). The cylinder 35 contains therein an annular piston 36 projected against the rotor 28 when hydraulic oil is supplied from an oil absorption opening 37 at the time of braking. On the other hand, a recessed part 39 extending over the whole circumference of the second annular wall 34 is formed in the outer side (the left-hand side of FIG. 1) of the second annular wall 34 contiguous via an outer peripheral wall 38 to the first annular wall 33, and the opening of the recessed part 39 is covered with an annular cover plate 40 to thereby make the second annular wall 34 hollow. The cover plate 40 is provided with a liquid supply opening 41 and liquid discharge opening 42. One end of a liquid supply hose 43 and that of a liquid discharge hose 44 are connected to the openings 41, 42, respectively, so that a cooling liquid can circulate freely in the recessed part 39 covered with the cover plate 40.

Two annular stators 46, each having a flow channel 45 on an inner side thereof for circulating the cooling liquid, are installed respectively between the end face 36a of the piston 36 fitted into the cylinder 35 of the first annular wall 33 and the rotor 28 located close to the piston 36 and between the two rotors 28.

As shown in FIG. 2, U-shaped flow channels 45a are intermittently provided on the inner sides of the respective stators 46 with both ends opened to the outer peripheral surfaces of the stators. The outer peripheral edges of the first and second annular walls 33, 34 are set contiguous to each other, whereas a plurality of recessed parts 48 are intermittently formed on the inner peripheral surface of the short cylindrical outer peripheral wall 38 with which the outer peripheral edges of the stators 46 communicate. Consequently, the open ends of the flow channels 45a adjacent to each other, out of the plurality of flow channels 45a, communicate with each other. A portion of the inner peripheral surface of the outer peripheral wall 38 which is located at the open peripheral edge of each recessed part 48 and a portion of the outer peripheral surface of each stator 46 are made flat. O-rings 49 are fitted in between both the portions to thereby keep liquid-sealing of the portions where the flow channels 45a are contiguous to the recessed parts 48.

Both the ends of the flow channel 45 consisting of the plurality of flow channels 45a respectively formed in the stators 46 and the plurality of recessed parts 48 alternately contiguously connected in series are connected liquid-sealably to a cooling liquid inlet 50 and a cooling liquid outlet 51 provided in the outer peripheral wall 38 to have the cooling liquid freely circulated in the flow channel 45 inside each of the stators 46.

More specifically, referring to FIGS. 1 and 2 representing a first embodiment of the present invention, the cooling liquid inlet and outlet 50, 51, whose liquid supply and discharge hoses 52, 53 are connected to the opening at the outer peripheral side end of the outer peripheral wall 38, and the opening at the inner peripheral side end of the outer peripheral wall 38 are matched with both the end openings of the flow channel 45. The liquid-sealing across both the openings is maintained by the O-rings 54 held between the inner peripheral surface of the outer peripheral wall 38 and the outer peripheral surface of the stator 46.

Figure 3:
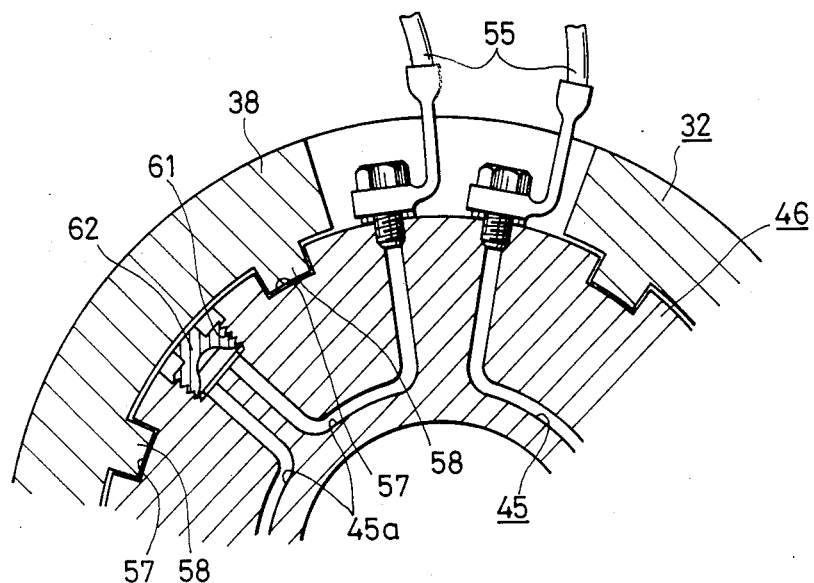
FIG. 3 is a sectional view of another liquid-cooled disc brake embodying the present invention, the view being taken in the same manner in FIG. 2.

In reference to FIG. 3, representing a second embodiment of the present invention, both the end openings of the flow channel 45 formed in the stator 46 are directly connected to flexible hoses 55. In this case, the recessed parts 48 as in the case of the first embodiment are not formed on the outer peripheral wall 48 of the caliper 32 but formed on the outer peripheral surface of each stator 46 instead. The adjacent flow channels 45a communicate with each other inside a cover plate 62 screwed into recessed part 61 to which the ends of the flow channels 45a are opened.

A plate member 56 held between the end face 36a of the piston 36 and the stator 46 shown in FIG. 1 is made of heat insulation material so as to prevent the heat of the stator 46 generated at the time of braking from transmitting to the brake oil within the cylinder 35.

As shown in FIGS. 2 and 3, recessed parts 57 formed on the outer peripheral surface of each stator 46 are fitted into protruded parts 58 formed on the inner peripheral surface of the outer peripheral wall 38, whereby the stator 46 is prevented from rotating inside the outer peripheral wall 38. Moreover, a stopper 60 is fitted to the inner peripheral surface of the outer peripheral wall 38 between the two stators 46 to suppress the shifting of the stator 46 on the outer side (exterior of the vehicle, i.e., the left-hand side of FIG. 1) toward the inner side.

In order to apply brake operation by means of the liquid-cooled disc brake thus constructed according to the present invention, hydraulic oil is supplied to the cylinder 35 in the first annular wall 33 so as to project the piston 36 fitted into the cylinder 35 toward the rotors 28, i.e., to the left of FIG. 1. The space between the end face 36a of the piston 36 and the second annular wall 34 is then narrowed, and the linings 28b secured to both sides of the two rotors 28, the sides of the two stators 46, and the inner side surface of the second annular wall 34 strongly rub against one another to effect braking operation.

At this time, the temperature of the frictional surface (the surfaces of the linings 28b, the sides of the stators 46, and the inner side surface of the second annular wall 34) rises as the linings 28b, the sides of the stators 46 and the inner side surface of the second annular wall 34 rub against one another. However, the heat is quickly taken off by the cooling liquid flowing through the flow channels 45 formed inside the stators 46 or the recessed parts 39 on the second annular wall 34, so that the temperatures of the frictional surfaces of the rotors 28, the stators 46, and the second annular wall 34 will never rise up to the extent that normal brake operation becomes impossible.

When the brake operation is not conducted, the piston is retracted into the cylinder 35, and the space between the end face of the piston 36 and the second annular wall 34 is increased. Although there is formed a small gap among the surfaces of the linings 28b of the rotors 28, the sides of the stators 46, and the inner side surface of the second annular wall 34, the rotors 28 rotate freely with respect to the fixed stators 46 because no liquid exists in that gap. Therefore, the rotating rotors 28 will not meet with such resistance while the brake is not operated as in the case of the conventional liquid-cooled disc brake.

The cooling liquid for being circulated through the flow channel 45 in each of the stators 46 and the recessed parts 39 of the second annular wall 34 and used to cool the frictional surfaces may be water or oil. Use of a liquid for cooling an engine will make it easier to secure such a cooling liquid.

Moreover, the recessed part 39 can be divided into a plurality of flow channels by providing a partition in the center of the recessed part 39 for distributing the cooling liquid to the interior of the second annular wall 34.

Since the liquid-cooled disc brake according to the present invention is thus constructed, the rotors rotating with wheels while braking is not applied encounter no resistance of the unrotatable fixed members, and the installation of the disc brake will not badly influence the power performance and fuel consumption ratio of a vehicle.

What is claimed is:

1. A liquid cooled disc brake for use in a vehicle, comprising:
   a rotatable shaft;
   at least one rotor fitted to the outer peripheral surface of said shaft, said rotor being unrotatable but slightly axially movable with respect to said shaft;
   a caliper secured to the vehicle body, said caliper having a first wall, a second wall having a hollow portion and positioned opposite to said first wall, and a third wall, said caliper being substantially U-shaped in section with its inner peripheral side opening to thereby surround the whole perimeter of said rotor, said hollow portion of said second wall having a cooling liquid therein which circulates freely through the hollow portion of said second wall, and said caliper having at an inner periphery thereof a plurality of recessed portions disposed at intervals;
   means for thrusting against said rotor provided at an inner side of said first wall of said caliper, said thrust means being operated at the time when braking is performed; and
   at least one stator provided in the opening portion of said U-shaped caliper, said stator being unrotatable with respect to said caliper, said stator also being urged by said thrust means against said rotor to thereby perform the braking operation, and said stator having therein a plurality of flow channels substantially U-shaped in section and disposed at intervals through which the cooling liquid circulates, each of said flow channels being provided with first and second open ends opening to the outside of said stator,
   wherein each of said first open ends of said flow channels communicates with said second open ends of adjacent flow channels through said respective recessed portions of said caliper so that all said flow channels are communicated with one another to form a substantially zig-zag flow of the cooling liquid.

2. A liquid-cooled disc brake of claim 1, further comprising:
   means for supplying and discharging the cooling liquid to and from said flow channels of said stator.

3. A liquid-cooled disc brake of claim 2, wherein the cooling liquid supplying and discharging means is provided with a cooling liquid inlet and a cooling liquid outlet which are formed in a peripheral wall and liquid-sealably connected to the ends of said flow channels of said stator.

4. A liquid-cooled disc brake of claim 2, wherein the cooling liquid supplying and discharging means is provided with flexible hoses connected liquid-sealably to the ends of said flow channels of said stator.

5. A liquid-cooled disc brake of claim 1, wherein said thrust means comprises a cylinder opening to an inner surface of said first wall and a piston fitted into said cylinder.

6. A liquid-cooled disc brake of claim 1, wherein said rotor comprises an annular metal base and linings formed of one of sintered metal and carbon, said linings being secured to both sides of said metal base.

7. A liquid-cooled disc brake for use in a vehicle, comprising:
   a rotatable shaft;
   at least one rotor fitted to the outer peripheral surface of said shaft, said rotor being unrotatable but slightly axially movable with respect to said shaft;
   a caliper secured to the vehicle body, said caliper having a first wall, a second wall having a hollow portion and positioned opposite to said first wall, and a third wall, said caliper being substantially U-shaped in section with its inner peripheral side opening to thereby surround the whole perimeter of said rotor, said hollow portion of said second wall having a cooling liquid therein which circulates freely through the hollow portion of said second wall;
   means for thrusting against said rotor provided at an inner side of said first wall of said caliper, said thrust means being operated at the time when braking is performed;
   at least one stator provided in the opening portion of said U-shaped caliper, said stator being unrotatable with respect to said caliper, said stator also being urged by said thrust means against said rotor to thereby perform the braking operation, and said stator having a plurality of recessed portions at an outer periphery thereof, said stator also having therein a plurality of flow channels substantially U-shaped in section and disposed at intervals through which the cooling liquid circulates, each of said flow channels being provided with first and second open ends opening to said recessed portions of said stator; and
   means for covering said recessed portions of said stator, said covering means being threadably secured to said recessed portion of said stator,
   wherein each of said first open ends of said flow channels communicates with said second open ends of adjacent flow channels through the inner side of said covering means so that all said flow channels are communicated with one another to form as substantially zig-zag flow of the cooling liquid.

8. A liquid-cooled disc brake of claim 7, further comprising:
   means for supplying and discharging the cooling liquid to and from said flow channels of said stator.

9. A liquid-cooled disc brake of claim 8, wherein the cooling liquid supplying and discharging means is provided with a cooling liquid inlet and a cooling liquid outlet which are formed in a peripheral wall and liquid-sealably connected to the ends of said flow channels of said stator.

10. A liquid-cooled disc brake of claim 7, wherein the cooling liquid supplying and discharging means is provided with flexible hoses connected liquid-sealably to the ends of said flow channels of said stator.

11. A liquid-cooled disc brake of claim 7, wherein said thrust means comprises a cylinder opening to an inner surface of said first wall and a piston fitted into said cylinder.

12. A liquid-cooled disc brake of claim 7, wherein said rotor comprises an annular metal base and linings formed of one of sintered metal and carbon, said linings being secured to both sides of said metal base.

* * * * *